No. 891,364. PATENTED JUNE 23, 1908.
H. H. OBERLY.
BRICK TRUCK OR WAGON.
APPLICATION FILED AUG. 27, 1907.

3 SHEETS—SHEET 1.

Witnesses
Frank B. Hoffman
M. J. Haas

Inventor
Howard H. Oberly
By
Attorney

No. 891,364. PATENTED JUNE 23, 1908.
H. H. OBERLY.
BRICK TRUCK OR WAGON.
APPLICATION FILED AUG. 27, 1907.

3 SHEETS—SHEET 2.

Witnesses
Frank B. Hoffman
W. J. Haas

Inventor
Howard H. Oberly
By
Attorney

No. 891,364. PATENTED JUNE 23, 1908.
H. H. OBERLY.
BRICK TRUCK OR WAGON.
APPLICATION FILED AUG. 27, 1907.

3 SHEETS—SHEET 3.

Witnesses
Frank B. Hoffman
M. I. Haas

Inventor
Howard H. Oberly
By
Attorney

UNITED STATES PATENT OFFICE.

HOWARD HENRY OBERLY, OF WILMINGTON, DELAWARE.

BRICK TRUCK OR WAGON.

No. 891,364.   Specification of Letters Patent.   Patented June 23, 1908.

Application filed August 27, 1907. Serial No. 390,289.

*To all whom it may concern:*

Be it known that I, HOWARD HENRY OBERLY, citizen of the United States, residing at Wilmington, in the county of Newcastle and State of Delaware, have invented certain new and useful Improvements in Brick Trucks or Wagons, of which the following is a specification.

This invention relates to brick trucks or wagons, designed for the purpose of conveying brick, tiling or other materials from place to place and depositing them wherever required, and one of the principal objects of the invention is to provide a strong and durable two or four wheeled vehicle with a detachable bottom or floor for supporting a load of bricks or other material and for carrying it under the vehicle box to the place where it may be desired to deposit the load, when said bottom or floor may be lowered to the ground and detached from the vehicle, and the vehicle may then pick up an empty floor or bottom, if any there be, and returned for another load.

The ordinary brick carts in present use in many places dump the bricks out of the rear end of the box, and in this way many bricks are injured and become practically worthless.

By means of my invention the bricks or other materials may be placed upon a bottom or floor lying flat upon the ground, and the truck may then be run over said bottom or floor and by means of a hoisting mechanism on the truck said bottom or floor may be raised and the brick conveyed to the place of deposit, the bottom or floor detached and the truck returned for another load. By the time the second load is delivered the bottom or floor at first deposited may have the bricks or materials removed therefrom and may then be carried back to the brick yard. Thus, ten or fifteen bottoms or floors can under ordinary circumstances be used to advantage. Under certain circumstances it is found desirable to first raise the floor or bottom before loading the vehicle, and either of the methods referred to may be utilized.

The objects and advantages referred to, and others, may be attained by means of the construction shown in the accompanying drawings, in which:—

Figure 1:
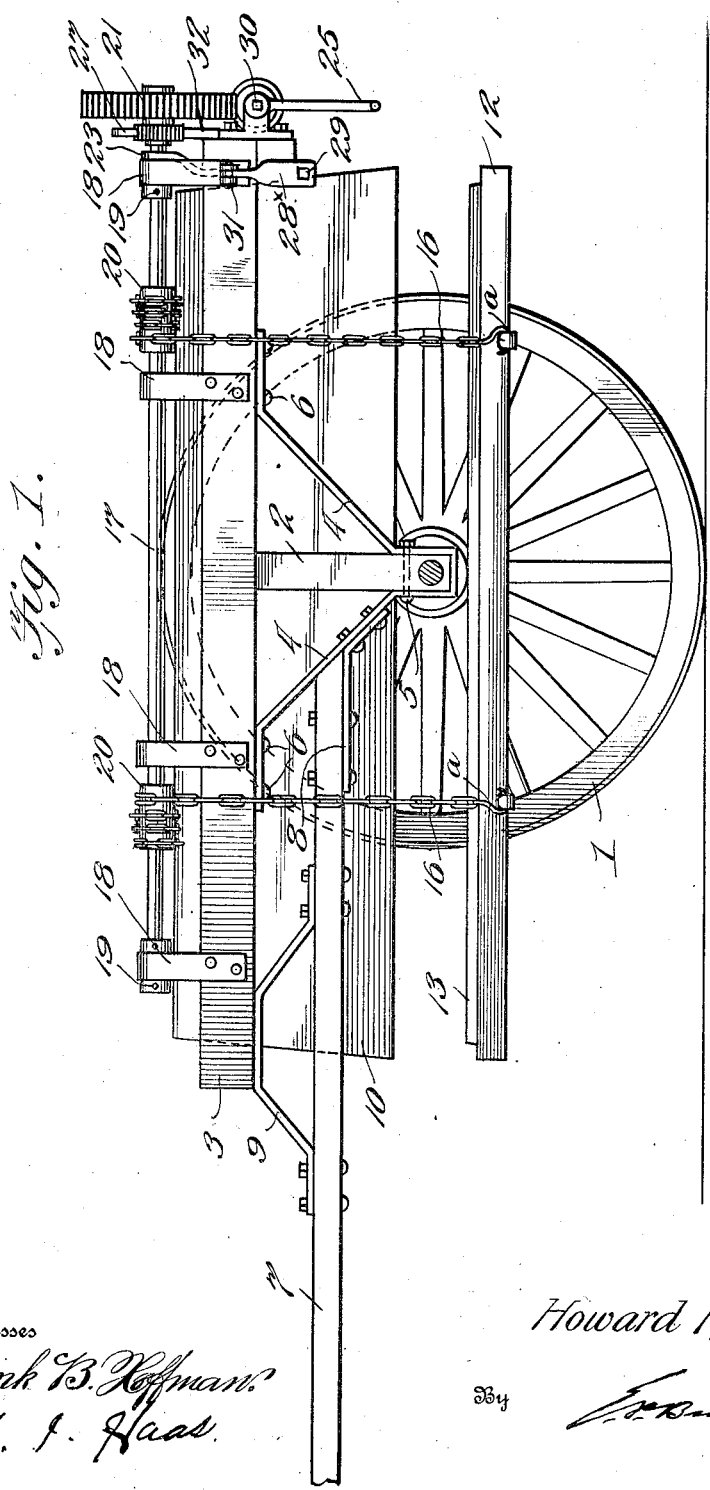
Figure 2:
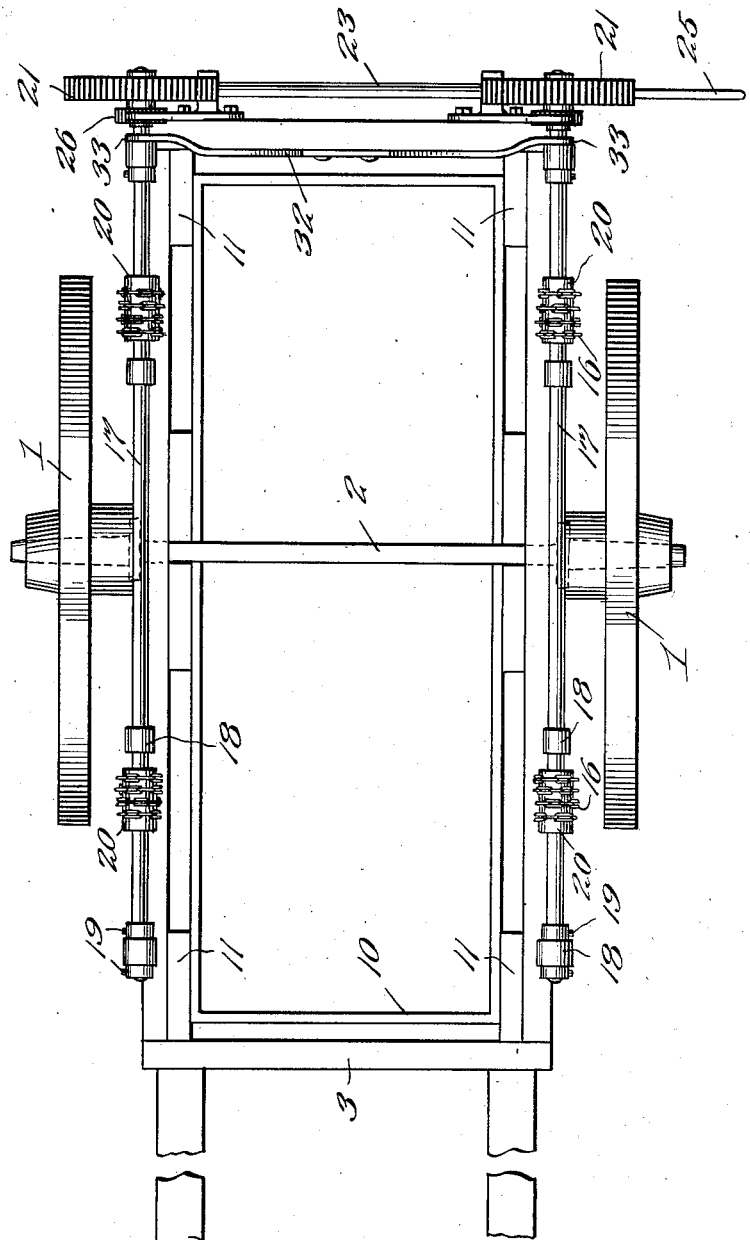
Figures 3, 4:
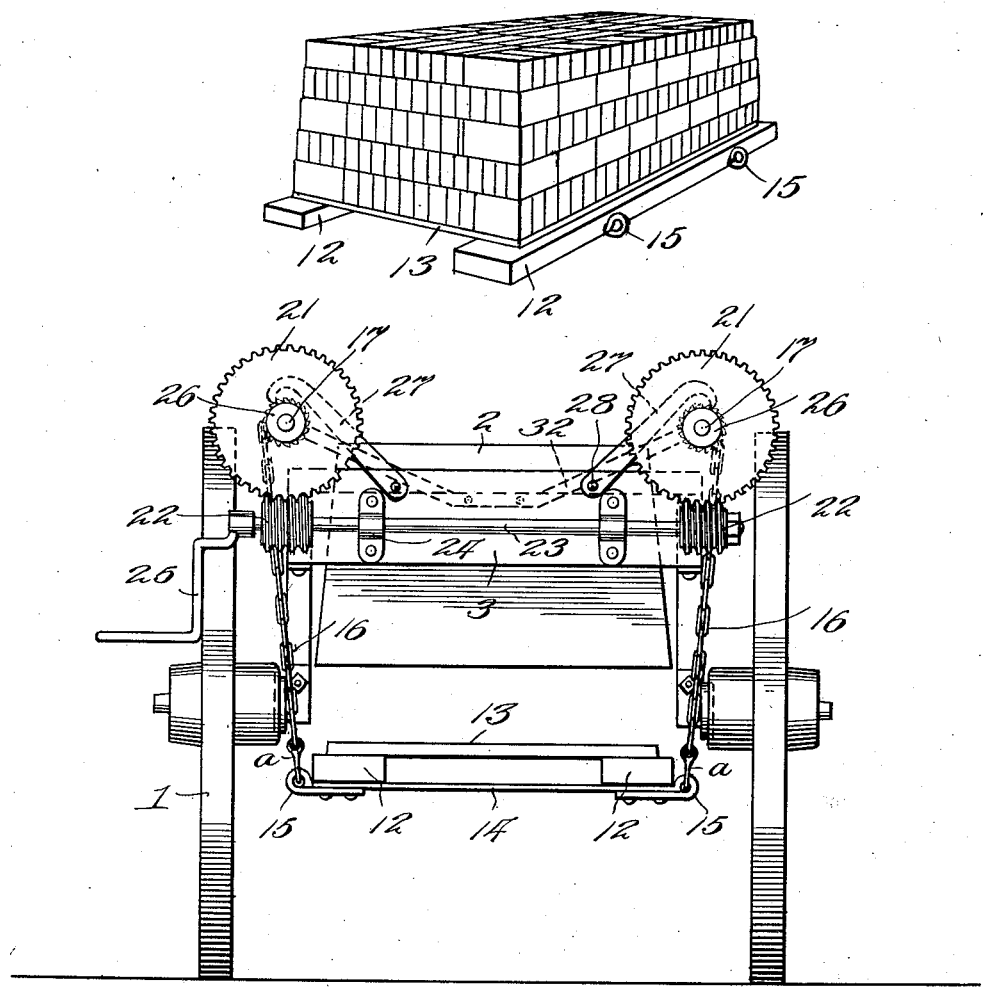

Figure 1 is a side elevation of a brick truck made in accordance with my invention. Fig. 2 is a top plan view of the same. Fig. 3 is a rear end elevation of the truck. Fig. 4 is a detail perspective view of the bottom or floor with a load of bricks thereon.

Referring to the drawing for a more specific description of my invention, the numeral 1 designates the wheels, mounted upon spindles projecting laterally from the arched axle 2. The axle 2 has straight vertical members which are connected at their upper portion by a cross-bar. While I have shown in the drawing a two wheeled cart or truck, it will be understood that I may use a four wheeled wagon with equal facility for my purpose.

A strong rectangular frame 3 is supported upon the axle 2 by means of the diverging bars 4, bolted at 5 to the axle and the upper end being secured under the frame 3 by bolts 6. It will be understood that the supporting bars 4 are located upon opposite sides of the frame 3. The shafts 7 are connected at their rear ends to braces 8, which are firmly bolted to the bars 4, and the shafts are connected by bolts to these braces, as shown in Fig. 1. Bolted to the shafts 7 and to the rectangular frame 3 are arched braces 9, said braces assisting in supporting the frame 3 and in connecting the shafts thereto. The box 10 of the truck is flared outwardly at its lower edges, as shown in Fig. 1, and said box is connected to the frame 3 by means of spacing blocks 11 bolted to the box and frame.

The bottom or floor consists of the two longitudinal rails 12, to which the floor 13 is secured, and the metal cross braces 14, said braces being firmly bolted under the rails 12, as shown in Fig. 3. The outer ends of the braces 14 are provided with eyes 15, and connected to these eyes by means of hooks *a* are the supporting and elevating chains 16.

Journaled on top of the two side bars of the rectangular frame 3 are the winding shafts 17, said shafts being mounted in strong metal bearing brackets 18, bolted to the frame 3, and extending above the same. Suitable stop collars 19 are secured to the shafts 17 to prevent endwise movement. Secured to the shafts 17 are the drums 20, upon which the chains 16 are wound to raise and lower the bottom or floor, said chains being secured to said drums. The chains are detachably connected to the eyes 15 of the braces 14 by means of the hooks *a*.

Fixed to the rear ends of the shafts 17 are worm gear wheels 21, which mesh with worms 22 on a transverse shaft 23 journaled in brackets 24 on the rear end of the frame 3. This shaft 23 is provided with a removable crank 25 fitted to the outer end thereof for rotating the worms 22 and raising and lowering the bottom or floor. It will be obvious that the gear wheels 21 may be connected to the front ends of the shafts 17, if desired.

Ratchet wheels 26 are fixed upon the shafts 17 near the worm gears 21, and the dogs or pawls 27 are pivoted at 28 to the frame 3 for holding the shafts 17 against backward movement.

A pivoted latch $28^\times$, provided with a square opening 29, is adapted to fit the squared end 30 of the worm shaft 23 to keep said shaft from moving while passing over rough roads. The latch $28^\times$ is pivoted to a swiveled yoke 31 secured to one of the bearings 18.

A cross brace 32 is secured to the end of the frame 3, said brace being provided with an eye 33 at each end, said eyes engaging the shafts 17.

The operation of my invention may be briefly described as follows:—After the bottom or floor 13 has been loaded with bricks or other material, the hooks $a$ on the chains 16 are connected to the eyes 15 and the bottom or floor is raised by the crank 25. When the crank 25 is removed from the squared end 30 of the shaft 23, the latch $28^\times$ is engaged with said end 30. The bottom or floor may first be raised to its proper position before the bricks or other material are placed thereon, if so desired. The truck or wagon is then taken to the place of deposit and can be driven close to the sidewalk. The bottom or floor is then lowered to the ground and the hooks $a$ on the chains detached from the eyes 15. The truck may then pick up an empty bottom or floor and is then returned for another load.

From the foregoing it will be obvious that my invention is of comparatively simple construction, is strong and durable, is efficient in operation, is economical in the handling of bricks or the like and saves time.

Many changes in details of construction may be resorted to without departing from the spirit and scope of the invention as defined in the following claims.

Having thus described the invention, what is claimed as new, is:—

1. In a brick truck or wagon, a frame, a box or body connected thereto forming a closed receptacle when the bottom is raised, a bottom or floor, shafts, drums on said shafts, chains connected to said drums and said bottom or floor, worm gear for raising and lowering said bottom or floor, and means for detaching said bottom or floor from the truck or wagon.

2. In a brick truck or wagon, a frame, a box or body connected thereto, said box having a flaring bottom, a bottom or floor, and means for detaching said bottom or floor from the truck or wagon.

3. A brick truck or wagon comprising a rectangular frame, shafts mounted to rotate on said frame, drums on said shafts, worm gears on said shafts, a transverse shaft, worms on said shaft to engage the worm gears, ratchets and pawls for holding the shafts against back rotation, a bottom or floor, chains detachably connected to said bottom or floor and permanently connected to said drums.

In testimony whereof I affix my signature, in presence of two witnesses.

HOWARD HENRY OBERLY.

Witnesses:
 JAMES B. OBERLY,
 JAMES MONAGHAN.